US012541990B2

(12) United States Patent
Goyal et al.

(10) Patent No.: US 12,541,990 B2
(45) Date of Patent: Feb. 3, 2026

(54) INFORMATION EXTRACTION FROM DOCUMENTS CONTAINING HANDWRITTEN TEXT

(71) Applicant: INTERNATIONAL BUSINESS MACHINES CORPORATION, Armonk, NY (US)

(72) Inventors: Saurabh Goyal, Jersey City, NJ (US); Catherine Finegan-Dollak, Mohegan Lake, NY (US); Ashish Verma, Nanuet, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 643 days.

(21) Appl. No.: 17/809,321

(22) Filed: Jun. 28, 2022

(65) Prior Publication Data

US 2023/0419710 A1    Dec. 28, 2023

(51) Int. Cl.
*G06V 30/414* (2022.01)
*G06F 40/205* (2020.01)
(Continued)

(52) U.S. Cl.
CPC .......... *G06V 30/414* (2022.01); *G06F 40/205* (2020.01); *G06F 40/279* (2020.01); *G06V 30/18143* (2022.01)

(58) Field of Classification Search
CPC ........... G06V 30/18143; G06V 30/414; G06V 30/416; G06V 30/1452; G06V 30/412; G06F 40/205; G06F 40/279
See application file for complete search history.

(56) References Cited

U.S. PATENT DOCUMENTS

| 10,713,524 B2 | 7/2020 | Duta |
| 2008/0187221 A1 | 8/2008 | Konno |

(Continued)

FOREIGN PATENT DOCUMENTS

| CN | 109492657 A | 3/2019 |
| CN | 113869320 A | 12/2021 |

OTHER PUBLICATIONS

International Searching Authority, "Notification of Transmittal of the international Search Report and the Written Opinion of the International Searching Authority, or Declaration," Patent Cooperation Treaty, Sep. 5, 2023, 10 pages, International Application No. PCT/EP2023/065139, 10 Pages.

(Continued)

*Primary Examiner* — Tracy Mangialaschi
(74) *Attorney, Agent, or Firm* — Rakesh Roy

(57) ABSTRACT

A method, computer system, and a computer program product for information extraction is provided. The present invention may include receiving, by a handwriting detection model of an integrated system, a mixed-text document including a combination of typed text and handwritten text, where the received mixed-text document includes at least one key-value pair. The present invention may also include receiving, by the handwriting detection model of the integrated system, a first location information of at least one key from the at least one key-value pair in the received mixed-text document. The present invention may further include detecting, by the handwriting detection model of the integrated system, at least one handwritten text in the received mixed-text document based on the received first location information of the at least one key.

18 Claims, 8 Drawing Sheets

(51) Int. Cl.
*G06F 40/279* (2020.01)
*G06V 30/18* (2022.01)

(56) References Cited

U.S. PATENT DOCUMENTS

| 2014/0245120 | A1* | 8/2014 | Schwartz | G06V 30/32 |
| | | | | 715/226 |
| 2020/0074169 | A1 | 3/2020 | Mukhopadhyay | |
| 2021/0133438 | A1 | 5/2021 | Florencio et al. | |
| 2021/0182547 | A1* | 6/2021 | Ayyadevara | G06V 10/82 |
| 2021/0295101 | A1 | 9/2021 | Tang et al. | |

OTHER PUBLICATIONS

Barnea, et al., "Contextual Object Detection with a Few Relevant Neighbors", ARXIV, Oct. 17, 2018, 16 Pages. arXiv:1711.05705v3.

Denk, et al., "BERTgrid: Contextualized Embedding for 2D Document Representation and Understanding", NeurIPS, ARXIV, Oct. 14, 2019, 4 Pages. arXiv:1909.04948v2.

Girshick, et al., "Rich feature hierarchies for accurate object detection and semantic segmentation Tech report (v5)", ARXIV, Oct. 22, 2014, 21 Pages. arXiv:1311.2524v5.

Katti, et al., Chargrid: Towards Understanding 2D Documents, EMNLP, Sep. 24, 2018, 11 Pages. arXiv:1809.08799v1.

Liu, et al., "Graph Convolution for Multimodal Information Extraction from Visually Rich Documents" ARXIV, Mar. 27, 2019, 8 Pages. arXiv:1903.11279v1.

Mell et al., "The NIST Definition of Cloud Computing", Recommendations of the National Institute of Standards and Technology, NIST Special Publication 800-145, Sep. 2011, 7 pages.

Torralba, et al., "Context-based vision system for place and object recognition", Proceedings Ninth IEEE International Conference on Computer Vision, Oct. 13-16, 2003, Accessed the Internet Jun. 27, 2022, 11 Pages. https://ieeexplore.ieee.org/document/1238354.

Xu, et al., "LayoutLM: Pre-training of Text and Layout for Document Image Understanding", KDD, Virtual Event, International Conference on Knowledge Discovery & Data Mining, Aug. 23-27, 2020, pp. 1192-1200. https://dl.acm.org/doi/10.1145/3394486.3403172.

* cited by examiner

INFORMATION EXTRACTION FROM DOCUMENTS CONTAINING HANDWRITTEN TEXT

BACKGROUND

The present invention relates generally to the field of computing, and more particularly to information extraction systems.

Information extraction is the process of automatically parsing through unstructured and/or semi-structured data and extracting essential information into editable and structured data formats (e.g., categorized data; contextually and semantically well-defined data). The growth of data that is available in unstructured and semi-structured data sources has increased the significance of information extraction technology. In many domains, unstructured and semi-structured data sources include handwritten text. Identifying and extracting handwritten information from unstructured and semi-structured data sources is a challenging task for information extraction systems.

SUMMARY

Embodiments of the present invention disclose a method, computer system, and a computer program product for information extraction is provided. The present invention may include receiving, by a handwriting detection model of an integrated system, a mixed-text document including a combination of typed text and handwritten text, where the received mixed-text document includes at least one key-value pair. The present invention may also include receiving, by the handwriting detection model of the integrated system, a first location information of at least one key from the at least one key-value pair in the received mixed-text document. The present invention may further include detecting, by the handwriting detection model of the integrated system, at least one handwritten text in the received mixed-text document based on the received first location information of the at least one key.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in under standing the invention in conjunction with the detailed description. In the drawings.

DETAILED DESCRIPTION

Figure 1:
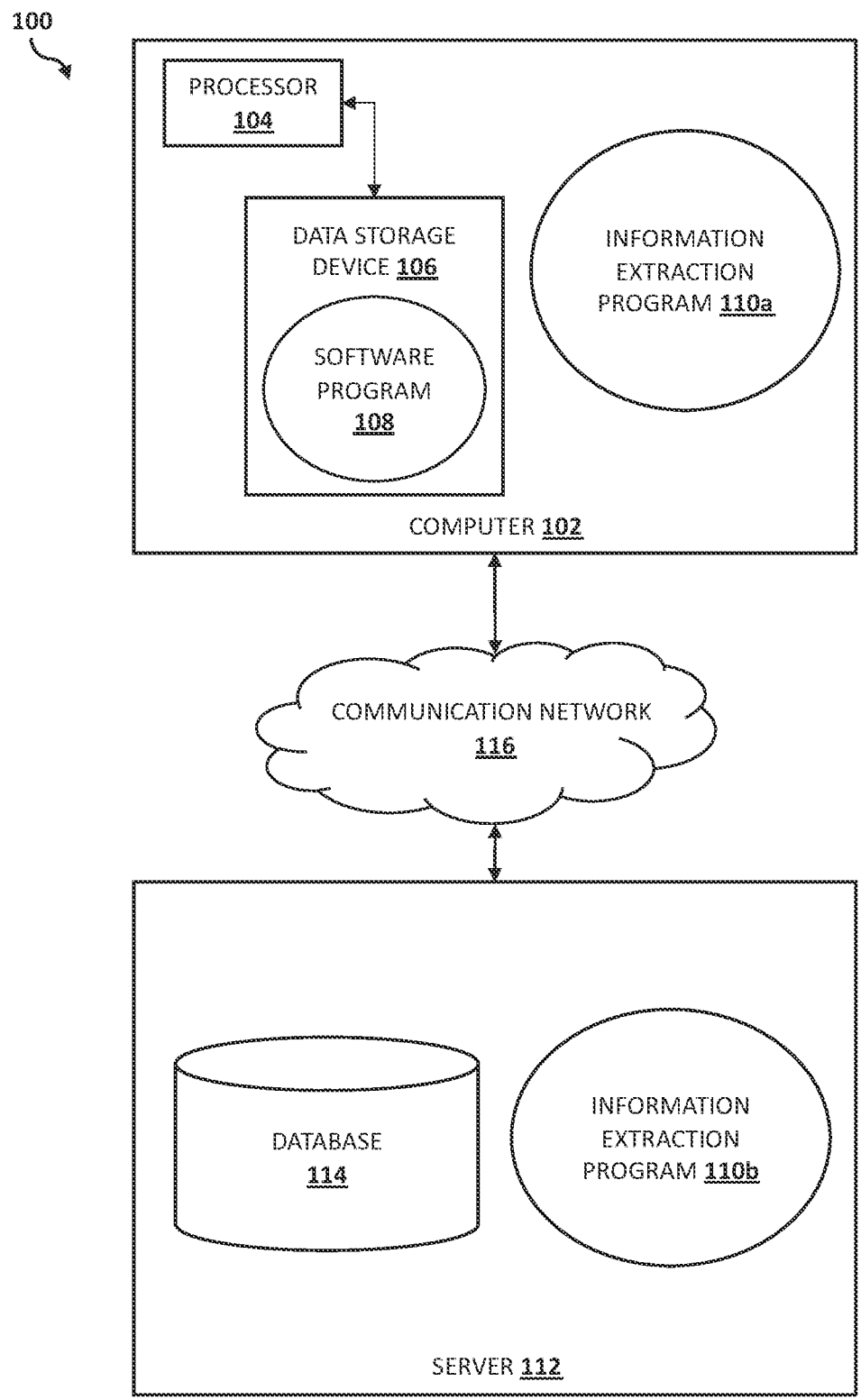
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable tangible storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enhanced information extraction from documents containing handwritten text. As such, the present embodiment has the capacity to improve the technical field of information extraction by combining a key-value pair (KVP) extraction task and a handwriting detection task to improve the performance of each task. More specifically, an information extraction program may enhance the information extraction from documents containing both typewritten text and handwritten text by implementing an integrated system comprising a KVP extraction component and a handwriting detection component. In one embodiment, the information extraction program may use contextual information from the KVP extraction component, such as, the location of KVPs to improve the performance of a handwriting detection model by localizing the handwritten text in a vicinity of the highlighted keys. In one embodiment, the information extraction program may use contextual information from the handwriting detection model to continuously improve the input to the KVP extraction component. The information extraction program may implement a feedback loop mechanism from each component to continuously improve the overall information extraction from the documents.

As described previously, information extraction is the process of automatically parsing through unstructured and/or semi-structured data and extracting essential information into editable and structured data formats (e.g., categorized data; contextually and semantically well-defined data). The growth of data that is available in unstructured and semi-structured data sources has increased the significance of information extraction technology. In many domains, unstructured and semi-structured documents include handwritten text. Identifying and extracting handwritten information from these unstructured and semi-structured documents is a challenging task for information extraction systems.

Many industries, such as, for example, the healthcare, pharmaceutical, mortgage, insurance, and banking industries rely on documents (e.g., forms) containing handwritten text and typed text. Extracting relevant, actionable information from these documents containing handwritten text and typed text is a crucial problem to solve for these, and many other industries.

In various use cases, extracting relevant, actionable information from documents may include identifying key-value pairs (KVPs). KVPs may refer to two linked data items—a key and a value. In one embodiment, a key may be used as a unique identifier for an attribute value. KVPs may exist in various types of text documents, such as, for example, invoices, forms, and government documents. In exemplary invoices, the keys may include the items purchased and the values may include the prices for the different items. In exemplary forms, the keys may include the data types/questions/information sought from a user and the values may include the responses/attributes filled in by the user (e.g., "Date" is the key and "Dec. 1, 2018" is the value). In exemplary government documents, the keys may include personal information data types, such as, for example, name and date of birth, and the values may include the attributes linked to the personal information data types.

In at least one embodiment, KVPs may exist in unstructured and semi-structured documents, and may include partially handwritten information. For instance, in form documents, the keys may include pre-printed data types/questions, and the values may include handwritten responses. Thus, automatic information extraction from documents including KVPs and partially handwritten information may include a KVP identification process and a handwriting identification process.

According to one embodiment, the KVP identification process may include an optical character recognition (OCR) engine to capture and convert text contained in images (e.g., printed books, photographs, scanned documents) into machine-readable data to enable editing, computing, and analysis by a computer in future steps. While OCR may be capable of converting typed text (e.g., pre-printed text in forms; keys) into machine-readable text formats, OCR techniques may not suitable for extracting and converting handwritten text (e.g., handwritten responses; values) to machine-readable text formats.

Therefore, it may be advantageous to, among other things, provide a way to leverage information obtained from a handwriting identification process to improve the performance of the KVP identification process by, for example, refining the OCR outputs (e.g., associated with handwritten text) which are the inputs for the KVP identification process.

Some challenges to handwriting identification may stem from high variability in handwriting styles, poor alignment of handwritten characters, poor quality of source document, and lack of publicly available annotated data for training. It is contemplated that contextual information may improve the classification and localization performance of a handwriting detection model. Therefore, it may also be advantageous to, among other things, provide a way to leverage information obtained from the KVP identification process (e.g., location of KVPs in the document) to improve the performance of the handwriting detection model.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an information extraction program 110a. The networked computer environment 100 may also include a server 112 that is enabled to run an information extraction program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the information extraction program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the information extraction program 110a, 110b (respectively) to enhance information extraction from documents containing both typed text and handwritten text by implementing an integrated system including a KVP identification component and handwritten text identification component. Embodiments of the present disclosure are explained in more detail below with respect to FIGS. 2 to 5.

Figure 2:
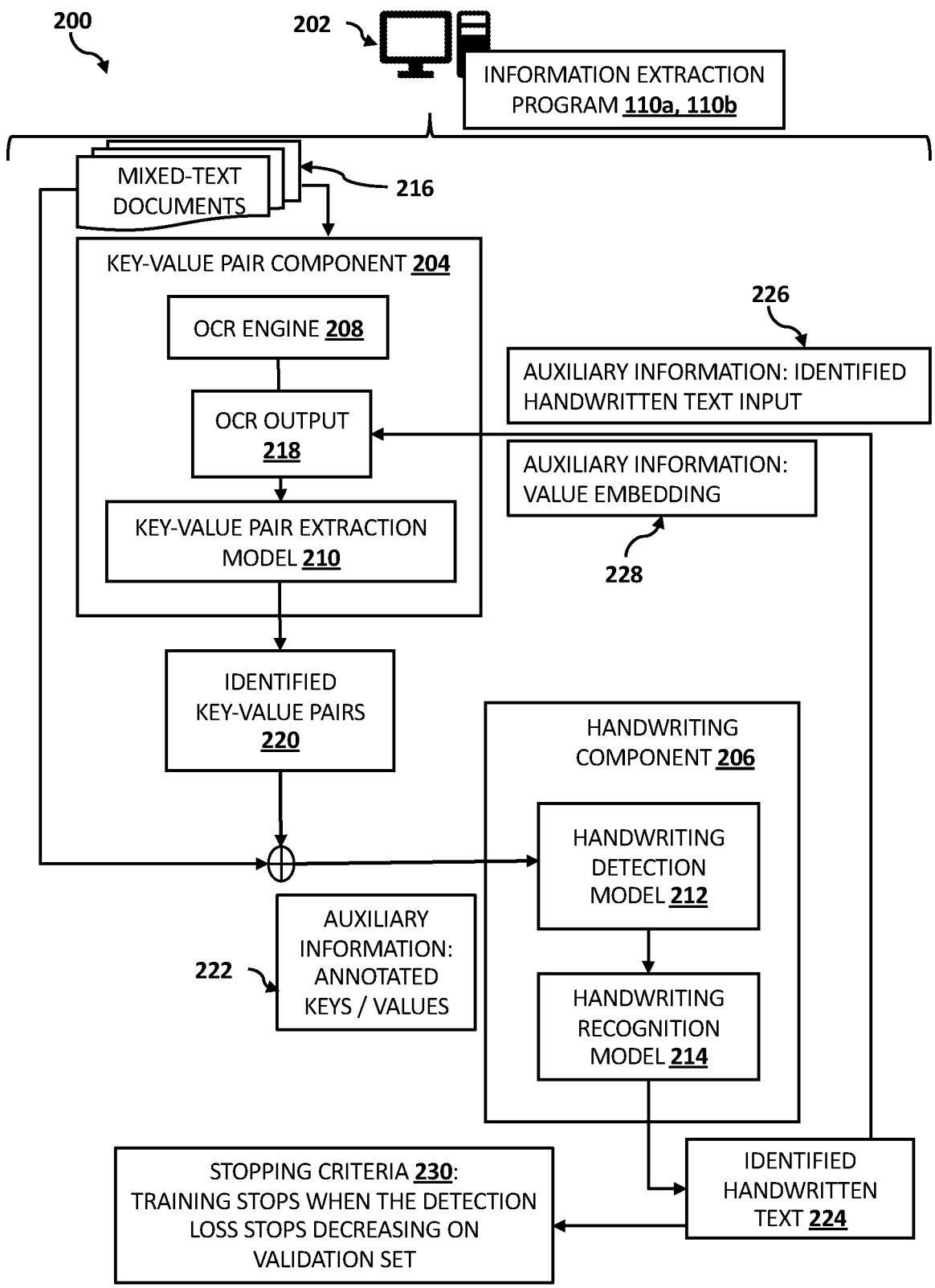
FIG. 2 is a schematic block diagram of an information extraction environment according to at least one embodiment.

Referring now to FIG. 2, a schematic block diagram of an information extraction environment 200 implementing the information extraction program 110a, 110b according to at least one embodiment is depicted.

According to one embodiment, the information extraction environment 200 may include one or more components (e.g., client computer 102; server computer 112; communication network 116) of the computer environment 100 discussed above with reference to FIG. 1.

According to one embodiment, the information extraction environment 200 may include a computer system 202 having a tangible storage device and a processor that is enabled to run the information extraction program 110a, 110b. In one embodiment, the information extraction program 110a, 110b may include a single computer program or multiple program modules or sets of instructions being executed by the processor of the computer system 202. The information extraction program 110a, 110b may include routines, objects, components, units, logic, data structures, and actions that may perform particular tasks or implement particular abstract data types. The information extraction program 110a, 110b may be practiced in distributed cloud computing environments where tasks may be performed by local and/or remote processing devices which may be linked through the communication network 116. In one embodiment, the information extraction program 110a, 110b may include program instructions that may be collectively stored on one or more computer-readable storage media.

According to one embodiment, the information extraction program 110a, 110b may include a key-value pair (KVP) component 204 and a handwriting component 206. In one embodiment, the KVP component 204 and the handwriting component 206 may be implemented as an integrated (e.g., interdependent) system which may feed into itself to improve the performance of both KVP and handwriting components 204, 206.

According to various embodiments, the KVP component 204 may also be referred to as a first information extraction component and the handwriting component 206 may also be referred to as a second information extraction component. In other embodiments, when referring first to the handwriting component 206 and referring second to the KVP component 204, the handwriting component 206 may be referred to as the first information extraction component and the KVP component 204 may be referred to as the second information extraction component.

According to one embodiment, the KVP component 204 may include an optical character recognition (OCR) engine 208 and a KVP extraction model 210. In one embodiment, the handwriting component 206 may include a handwriting detection model 212 and a handwriting recognition model 214.

According to one embodiment, the integrated system of the information extraction environment 200 may perform information extraction on one or more mixed-text documents 216. In one embodiment, the mixed-text document 216 may include any document or data source (e.g., unstructured and/or semi-structured) including a combination of typed text (e.g., machine printed) and handwritten text.

Unstructured data sources for the mixed-text document 216 may include, for example, web pages, electronic mails (e-mails), documents, portable document format (PDF) files, text contained in images (e.g., printed books, photographs, scanned documents), and other digitally accessible freeform text sources. Semi-structured data sources for the mixed-text document 216 may include, for example, invoices, purchase orders, insurance forms, loan applications, and any other type of text contained in images that combines features of both structured data and unstructured data.

According to one embodiment, the information extracting problem 110a, 110b may implement the KVP component 204 to receive the mixed-text documents 216 for initial processing by the OCR engine 208. In one embodiment, the OCR engine 208 may perform a text recognition task to capture and convert the text contained in the mixed-text documents 216 into machine-readable text (e.g., extracting characters of a word present in an image). In one embodiment, the OCR engine 208 may generate an OCR output 218 which may include the machine-readable text recognized by the OCR engine 208. In one embodiment, the OCR output 218 may also include two-dimensional (2-D) position data (e.g., relative spatial position in the mixed-text document) of each word recognized in the mixed-text document 216. For example, the OCR output 218 may include boundary box coordinates for each recognized word and the text within those boundary boxes.

According to one embodiment, the information extraction program 110a, 110b may transmit the OCR output 218 as input for the KVP extraction model 210. In one embodiment, the KVP extraction model 210 may extract or identify one or more KVPs 220 in the mixed-text document 216. In one embodiment, the KVP extraction model 210 may include a pre-trained language model that may be encoded with text information and document layout information (e.g., relative position of words in the document) from the OCR engine 208 to predict and label KVPs. According to at least one embodiment, the OCR output 218 may serve as input training data to train the KVP extraction model 210 to identify the KVPs in the mixed-text document 216.

According to one embodiment, the identified KVPs 220 may include one or more keys identified by the KVP model 210. In one embodiment, the keys identified by the KVP model 210 may be provided as typed text in the mixed-text document 216, which the OCR engine 208 may be capable of recognizing and converting to machine-readable text. In one embodiment, the identified KVPs 220 may include one or more values identified by the KVP model 210. As described previously, the OCR engine 208 may not be suitable for extracting and converting handwritten text (e.g., handwritten responses; values) into machine-readable text formats. Therefore, in initial iterations (e.g., first iteration), the portion of the OCR output 218 associated with the handwriting text (e.g., value) recognized by the OCR engine 208 may have low accuracy. In an initial iteration, the low accuracy of the input to the KVP extraction model 210 (e.g., OCR output 218) may result in the KVP extraction model 210 improperly identifying the value attribute in the identified KVPs 220. However, as will be further detailed below, outputs from the handwriting component 206 may be leveraged as auxiliary information to refine the OCR outputs 218 in subsequent iterations and improve the performance of the KVP extraction model 210. In at least one embodiment, the identified KVPs 220 may include one or more keys and one or more values identified by the KVP model 210.

According to one embodiment, the identified KVPs 220 output from the KVP extraction model 210 may include location information. For example, a key may include a first location information and the value may include a second location information. In one embodiment, the location information may refer to 2-D position data (e.g., relative spatial position in the mixed-text document) of the keys and values in the mixed-text document 216. In at least one embodiment, the location information of the keys and values may be provided by the OCR output 218 which includes the 2-D position data of each word recognized in the mixed-text document 216.

Figure 3:
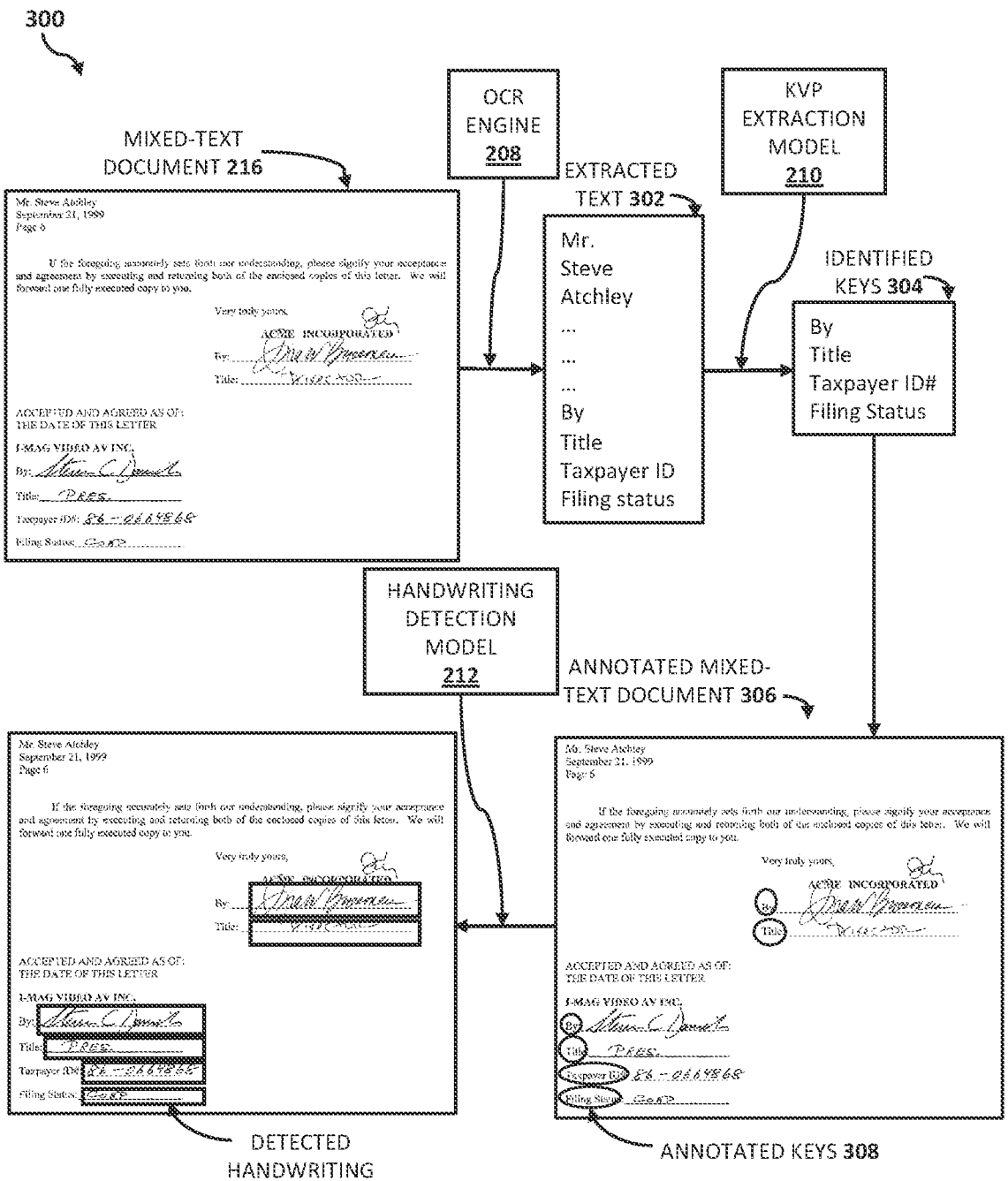
FIG. 3 is a schematic diagram of a first exemplary implementation of an information extraction program according to at least one embodiment.
Figure 4:
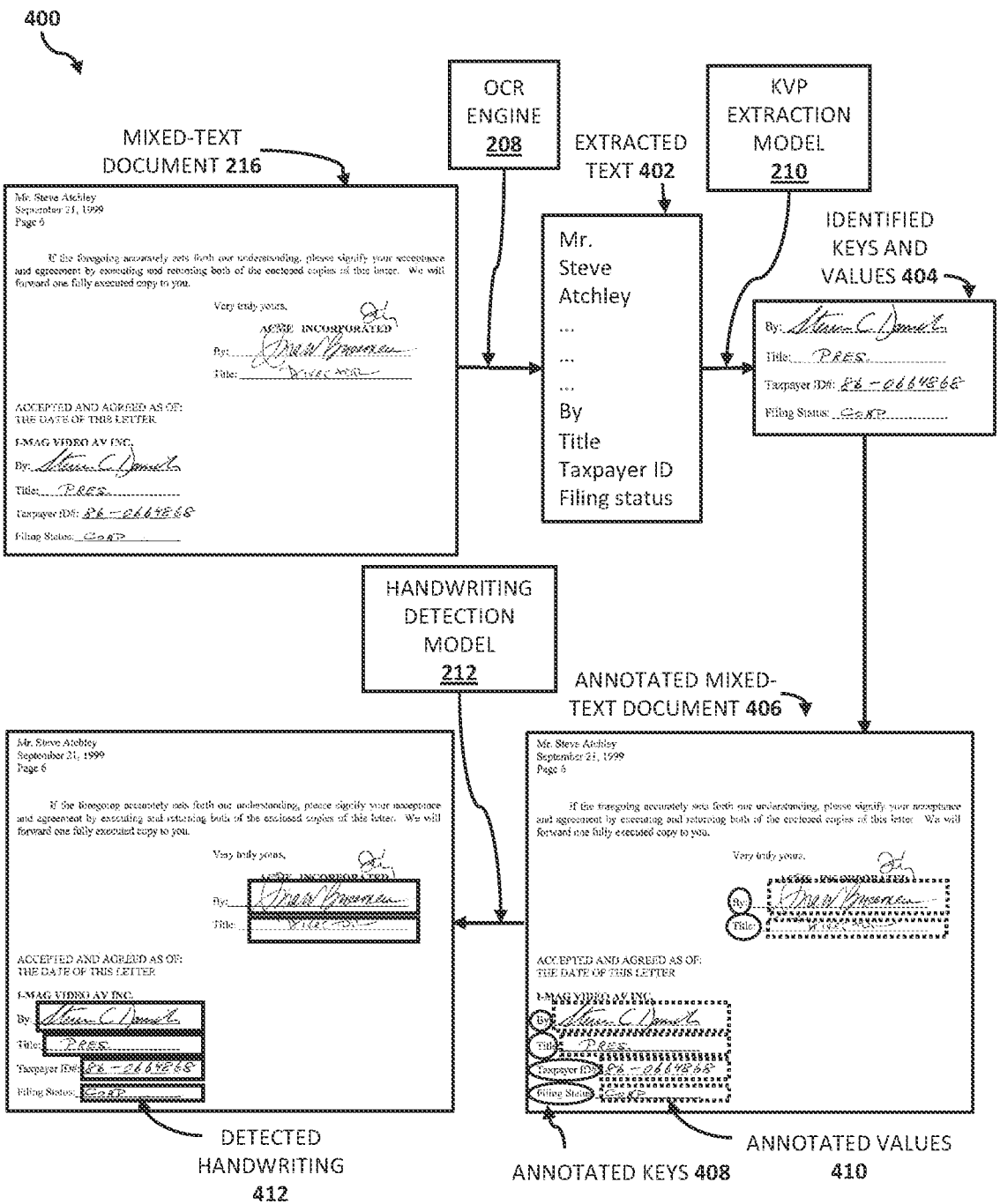
FIG. 4 is a schematic diagram of a second exemplary implementation of the information extraction program according to at least one embodiment.

According to one embodiment, the information extraction program 110a, 110b may annotate the identified keys and values in the mixed-text document 216 (e.g., annotated keys/values 222). In one embodiment, annotating the identified keys and values may include generating a bounding box or other shape around the keys and values to indicate a relative spatial position of the keys and values in the mixed-text document 216. In one embodiment, the identified keys and values may include different annotations to indicate the different data types. For example, the information extraction program 110a, 110b may annotate the identified keys using an oval bounding shape, as illustrated in FIG. 3, and may annotate the identified values using a dotted bounding box, as illustrated in FIG. 4. Other types of annotations (e.g., highlights, colored bounding shapes) may also be implemented in various embodiments.

According to one embodiment, the annotated keys/values 222 may be provided by the information extraction program 110a, 110b as auxiliary information/input for the handwriting detection model 212. In one embodiment, the annotated keys/values 222 my only include annotated keys provided by the information extraction program 110a, 110b. In other embodiments, the information extraction program 110a, 110b may include both annotated keys and annotated values provided by the information extraction program 110a, 110b. In one embodiment, the handwriting detection model 212 may receive the mixed-text document 216 and the annotated keys/values 222 (e.g., annotated keys and/or annotated values) as a joint input for the handwriting detection model 212.

According to one embodiment, if the handwriting detection model 212 receives the mixed-text document 216 with annotated keys (e.g., first location information), the information extraction program 110a, 110b may train the handwriting detection model 212 to search for/localize the handwritten text (e.g., the value) within a vicinity (e.g., in proximity) of the annotated key. In one embodiment, if the handwriting detection model 212 receives the mixed-text document 216 with both annotated keys (e.g., first location information) and annotated values (e.g., second location information), the information extraction program 110a, 110b may train the handwriting detection model 212 to search for/localize the handwritten text (e.g., the value) at the location of the annotated values.

According to one embodiment, the handwriting detection model 212 may include a pre-trained object detection model (e.g., RetinaNet, Yolo) which may be trained to detect handwritten text using the mixed-text documents 216 (e.g., document dataset containing handwritten text) and the auxiliary/contextual information provided by the annotated keys/values 222.

According to one embodiment, after the handwriting detection model 212 detects/localizes the handwritten text in the mixed-text document 216, the handwriting component 206 may implement the handwriting recognition model 214 to identify the detected handwritten text and output an identified handwritten text 224. In one embodiment, the identified handwritten text 224 may include detecting the location of handwritten text from the documents and recognizing the handwritten characters within those detected locations. In one embodiment, the identified handwritten text 224 may include the handwritten text converted into machine-readable text.

According to one embodiment, the information extraction program 110a, 110b may transmit the identified handwritten text 224 output from the handwriting recognition model 214 to the KVP component 204 as identified handwritten text input 226. In one embodiment, the identified handwritten text input 226 may include an auxiliary information to refine the OCR output 218 after the first iteration of the feedback loop implemented by the information extraction program 110a, 110b. As described previously, the OCR engine 208 may not be suitable for extracting and converting handwritten text (e.g., handwritten responses; values) into machine-readable text formats. In one embodiment, the OCR output 218 associated with recognizing the handwritten text (e.g., value) by the OCR engine 208 may include one or more errors. Therefore, the information extraction program 110a, 110b may provide the identified handwritten text input 226 to correct any errors in the OCR output 218 associated with the handwritten text (e.g., value) recognized by the OCR engine 208. It is contemplated that refining the OCR output 218, and thus the input to the KVP model 210, with the correct machine-readable text associated with the handwritten text, may improve the performance of the KVP extraction model 210.

According to one embodiment, the information extraction program 110a, 110b may also add a value embedding 228 as part of the input to the KVP extraction model 210. As described previously, the values in a key-value pairs may be provided as handwritten text in the mixed-text document 216. Therefore, adding a value embedding 228 which corresponds to the identified handwritten text input 226 to the KVP model 210 may enable the KVP model 210 to accurately identify the values in the identified KVPs 220. In one embodiment, value embedding 228 may also improve the second location information of the value (e.g., provided by the annotated keys/values 222) in the mixed-text document 216. In one embodiment, the value embedding 228 may be provided as a value embedding layer in the input to the KVP model 210. In one embodiment, the value embedding layer may indicate a "1" if the corresponding text in the OCR output 218 is part of the value data type and may indicate a "0" if the corresponding text in the OCR output 218 is not part of the value data type (e.g., may refer to a key data type). In at least one embodiment, any suitable indicator may be implemented in the value embedding layer to indicate whether the corresponding text is part of the value data type or the key data type.

According to one embodiment, the information extraction program 110a, 110b may include a stopping criteria 230 where the information extraction program 110a, 110b may stop the training process in the information extraction environment 200 when a loss function stops decreasing on a validation set. In one embodiment, the mixed-text documents 216 may be divided into a training set, a validation set, and a test set. In one embodiment, the training set may comprise 80% of the documents in the mixed-test documents 216, the validation set may comprise 10% of the documents in the mixed-test documents 216, and the test set may comprise 10% of the documents in the mixed-test documents 216. Various embodiments may divide the mixed-text documents 216 into the training set, the validation set, and the test set according to other suitable splits.

In one embodiment, the handwriting component 206 may include a loss function associated with the handwriting detection model 212. In one embodiment, the loss function may define the objective which the performance of the handwriting detection model 212 may be evaluated against. In one embodiment, the loss function associated with the handwriting detection model 212 may stop decreasing when the output of the handwriting detection model 212 (e.g., detected handwritten text; detected value) becomes the same as the output of the KVP extraction model 210 (e.g., identified value in the identified KVPs 220) over several iterations of the feedback loop. In at least one embodiment, the KVP component 204 may include a loss function associated with the KVP extraction model 210. In one embodiment, the loss function associated with the KVP extraction model 210 may stop decreasing when the output of the KVP extraction model 210 (e.g., identified KVPs 220) does not change over several iterations of the feedback loop.

Referring now to FIG. 3, a schematic block diagram of a first exemplary implementation 300 of the information extraction program 110a, 110b according to at least one embodiment is depicted.

According to one embodiment, the information extraction program 110a, 110b may pass a mixed-text document 216 through an OCR engine 208 to extract the text (e.g., extracted text 302) from the mixed-text document 216. In one embodiment, the extracted text 302 may be included in the OCR output 218, as described previously with reference to FIG. 2. In one embodiment, the information extraction program 110a, 110b may implement the KVP extraction model 210 to receive the extracted text 302 and identify one or more keys (e.g., identified keys 304) in the extracted text 302. In one embodiment, the information extraction program 110a, 110b may then generate an annotated mixed-text document 306 including one or more annotated keys 308. In the example illustrated in FIG. 3, the annotated keys 308 are annotated using a bounding shape. Other annotation methods are also contemplated. In one embodiment, the annotated key 308 in the annotated mixed-text document 306 may generate the first location information of the respective key in the document. In one embodiment, the handwriting detection model 212 may receive the annotated mixed-text document 306 including the first location information provided by the annotated keys 308. Thereafter, the handwriting detection model 212 may detect one or more handwritten texts (e.g., detected handwriting 310) in the mixed-text document based on the first location information of the key. In one embodiment, the handwriting detection model 212 may be trained to search for handwritten texts within a vicinity (e.g., in proximity) of the annotated keys 308.

Referring now to FIG. 4, a schematic block diagram of a second exemplary implementation 400 of the information extraction program 110a, 110b according to at least one embodiment is depicted.

According to one embodiment, the information extraction program 110a, 110b may pass a mixed-text document 216 through an OCR engine 208 to extract the text (e.g., extracted text 402) from the mixed-text document 216. In one embodiment, the extracted text 402 may be included in the OCR output 218, as described previously with reference to FIG. 2. In one embodiment, the information extraction program 110a, 110b may implement the KVP extraction model 210 to receive the extracted text 402 and identify one or more keys and one or more values (e.g., identified keys and values 404) in the extracted text 402. In one embodiment, the information extraction program 110a, 110b may then generate an annotated mixed-text document 406 including one or more annotated keys 408 and one or more annotated values 410. In the example illustrated in FIG. 4, the annotated keys 408 are annotated using an oval bounding shape and the annotated values 410 are annotated using a dotted bounding box. Other annotation methods are also contemplated. In one embodiment, the annotated key 408 in the annotated mixed-text document 406 may generate the first location information of the respective key in the document. Similarly, the annotated value 410 in the annotated mixed-text document 406 may generate the second location information of the respective value in the document. In one embodiment, the handwriting detection model 212 may receive the annotated mixed-text document 306 including the first location information provided by the annotated keys 408 and the second location information provided by the annotated values 410. Thereafter, the handwriting detection model 212 may detect one or more handwritten texts (e.g., detected handwriting 412) in the mixed-text document based on the second location information of the value. More specifically, in embodiments where the handwriting detection model 212 receives annotated values 410, the handwriting detection model 212 may be trained to search for handwritten texts at the location of the annotated values 410 (e.g., within the bounding box annotating the values).

Figure 5:
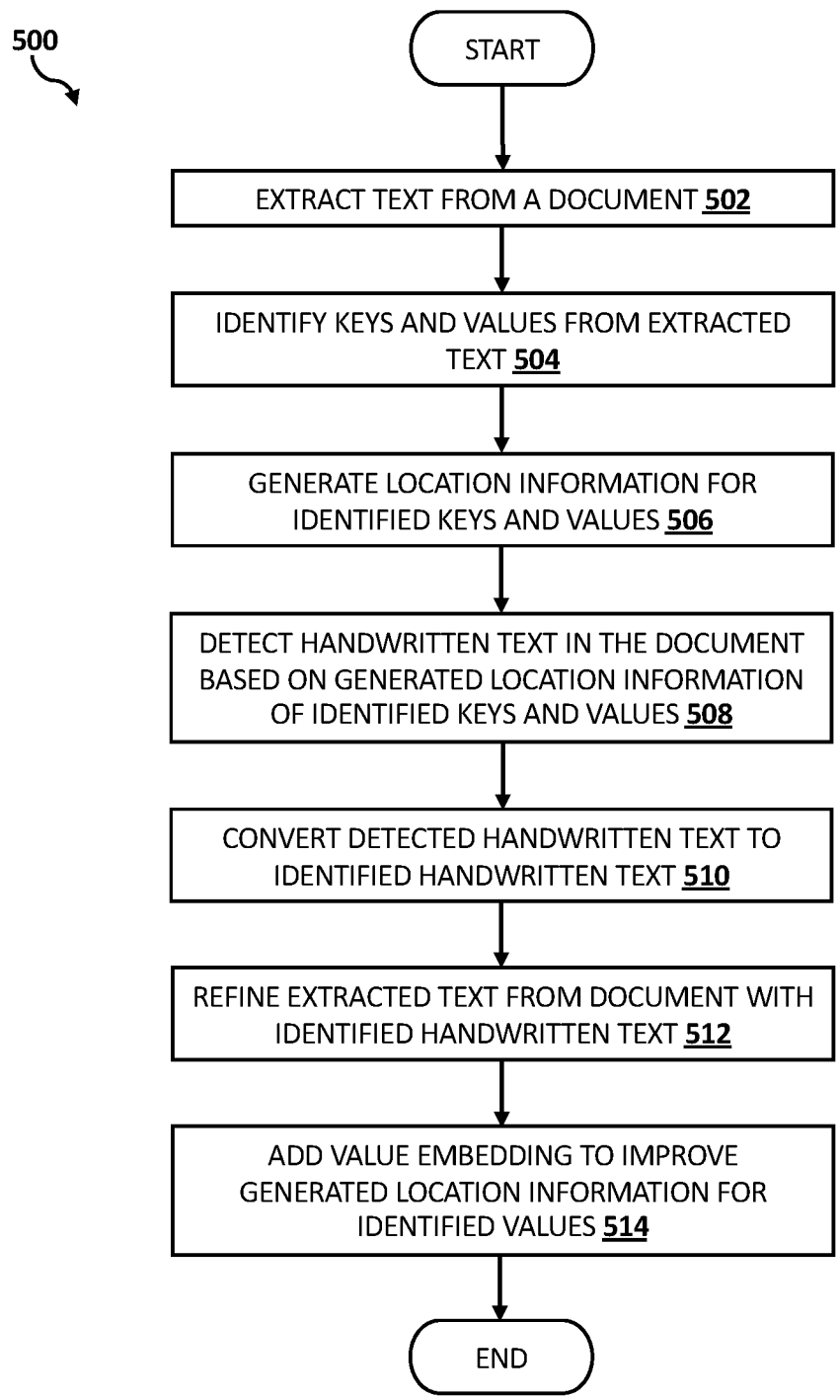
FIG. 5 is an operational flowchart illustrating an information extraction process according to at least one embodiment.

Referring now to FIG. 5, an operational flowchart illustrating the exemplary information extraction process 500 used by the information extraction program 110a, 110b according to at least one embodiment is depicted. According to one embodiment, FIG. 5 provides a general description of the information extraction process 500 with reference to the information extraction environment 200 illustrated in FIG. 2 and the first and second exemplary implementations 300 (FIG. 3), 400 (FIG. 4) of the information extraction program 110a, 110b.

At 502, text is extracted from a document. According to one embodiment, the information extraction program 110a, 110b may implement an OCR component (e.g., OCR engine 208) of an integrated system to extract one or more texts from a mixed-text document. In one embodiment, the mixed-text document may include a combination of typed text and handwritten text. In one embodiment, the mixed-text document may include at least one key-value pair (KVP). In one embodiment, the extracted text may be included in the OCR output, as described previously with reference to FIG. 2. In one embodiment, the OCR output may also include two-dimensional (2-D) position data (e.g., relative spatial position in the mixed-text document) of each extracted text (e.g., word recognized in the mixed-text document 216). For example, the OCR output may include boundary box coordinates for each recognized word and the extracted text within those boundary boxes.

Then at 504, one or more keys and one or more values are identified from the extracted text. According to one embodiment, the information extraction program 110a, 110b may implement a KVP extraction model of the integrated system to identify at least one KVP from the extracted text from the received mixed-text document. In one embodiment, the KVP extraction model may include a pre-trained language model that may be encoded with text information (e.g., text embedding layer) and document layout information (e.g., position embedding layer; relative position of words in the document) from the OCR engine to predict and label KVPs, as described previously with reference to FIG. 2.

Then at 506, one or more location information is generated for the identified keys and values. According to one embodiment, the identified KVPs output from the KVP extraction model may include location information. For example, a key may include a first location information and the value may include a second location information. In one embodiment, the location information may refer to 2-D position data (e.g., relative spatial position in the mixed-text document) of the keys and values in the mixed-text document. In at least one embodiment, the location information of the keys and values may be provided by the OCR output which includes the 2-D position data of each word recognized in the mixed-text document. According to one embodiment, the information extraction program 110a, 110b may annotate the identified keys and values in the mixed-text document. In one embodiment, annotating the identified keys and values may include generating a bounding box or other shape around the keys and values to indicate a relative spatial position of the keys and values in the mixed-text document. In one embodiment, the annotated key in an annotated mixed-text document may generate the first location information of the respective key in the document. Similarly, the annotated value in the annotated mixed-text document may generate the second location information of the respective value in the document.

Then at 508, handwritten text is detected in the document based on the generated location information of the identified keys and values. In one embodiment, a handwriting detection model of the integrated system may receive the mixed-text document and the annotated keys/values as a joint input (e.g., annotated mixed-text document 306, 406) for the handwriting detection model. According to one embodiment, if the handwriting detection model receives the mixed-text document with annotated keys (e.g., first location information), the information extraction program 110a, 110b may train the handwriting detection model to search for/localize the handwritten text (e.g., the value) within a vicinity (e.g., in proximity) of the annotated key. In one embodiment, if the handwriting detection model receives the mixed-text document with both annotated keys (e.g., first location information) and annotated values (e.g., second location information), the information extraction program 110a, 110b may train the handwriting detection model to search for/localize the handwritten text (e.g., the value) at the location of the annotated values.

Then at 510, the detected handwritten text is converted to identified handwritten text. According to one embodiment, after the handwriting detection model detects/localizes the handwritten text in the mixed-text document, the information extraction program 110a, 110b may implement a handwriting recognition model of the integrated system to identify the detected handwritten text and output an identified handwritten text. In one embodiment, the identified handwritten text may include detecting the location of handwritten text from the documents and recognizing the handwritten characters within those detected locations. In one embodiment, the identified handwritten text may include the handwritten text converted into machine-readable text, as described previously with reference to FIG. 2.

Then at 512, the text extracted from the document is refined with the identified handwritten text. According to one embodiment, the information extraction program 110a, 110b may transmit the identified handwritten text output from the handwriting recognition model to the KVP component as identified handwritten text input. In one embodiment, the identified handwritten text input may be implemented to refine the OCR output after the first iteration of the feedback loop implemented by the information extraction program 110a, 110b. In one embodiment, the OCR output associated with recognizing the handwritten text (e.g., value) by the OCR engine may include one or more errors. Therefore, the information extraction program 110a, 110b may provide the identified handwritten text input to correct any errors in the OCR output associated with the handwritten text (e.g., value) recognized by the OCR engine. It is contemplated that refining the OCR output, and thus the input to the KVP model, with the correct machine-readable text associated with the handwritten text, may improve the performance of the KVP extraction model.

Then at 514, a value embedding is added to improve the generated location information for identified values. According to one embodiment, the information extraction program 110a, 110b may also add a value embedding as part of the input to the KVP extraction model, following the first iteration of the feedback loop implemented by the information extraction program 110a, 110b. It is contemplated that adding a value embedding which corresponds to the identified handwritten text input to the KVP model may enable the KVP model to accurately identify the values in the identified KVPs. In one embodiment, the value embedding may be provided as a value embedding layer in the input to the KVP model, as described previously with reference to FIG. 2.

Accordingly, the information extraction program 110a, 110b may improve the functionality of a computer because the information extraction program 110a, 110b may enable the computer to combine a KVP extraction task and a handwriting detection task to improve the performance of each task. The information extraction program 110a, 110b may enable the computer to improve the performance of KVP extraction from handwritten documents by continuously providing better quality input data and by incorporating the value embeddings as an input to the KVP extraction model. The information extraction program 110a, 110b may also enable the computer to adapt the concepts of contextual object detection from vision domain to improve the handwriting detection for documents. The embodiments disclosed above do not depend on any prior knowledge about the template of the documents or any pre-defined layouts to extract the keys and corresponding values from known locations. The embodiments disclosed above also do not depend on any page segmentation techniques.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
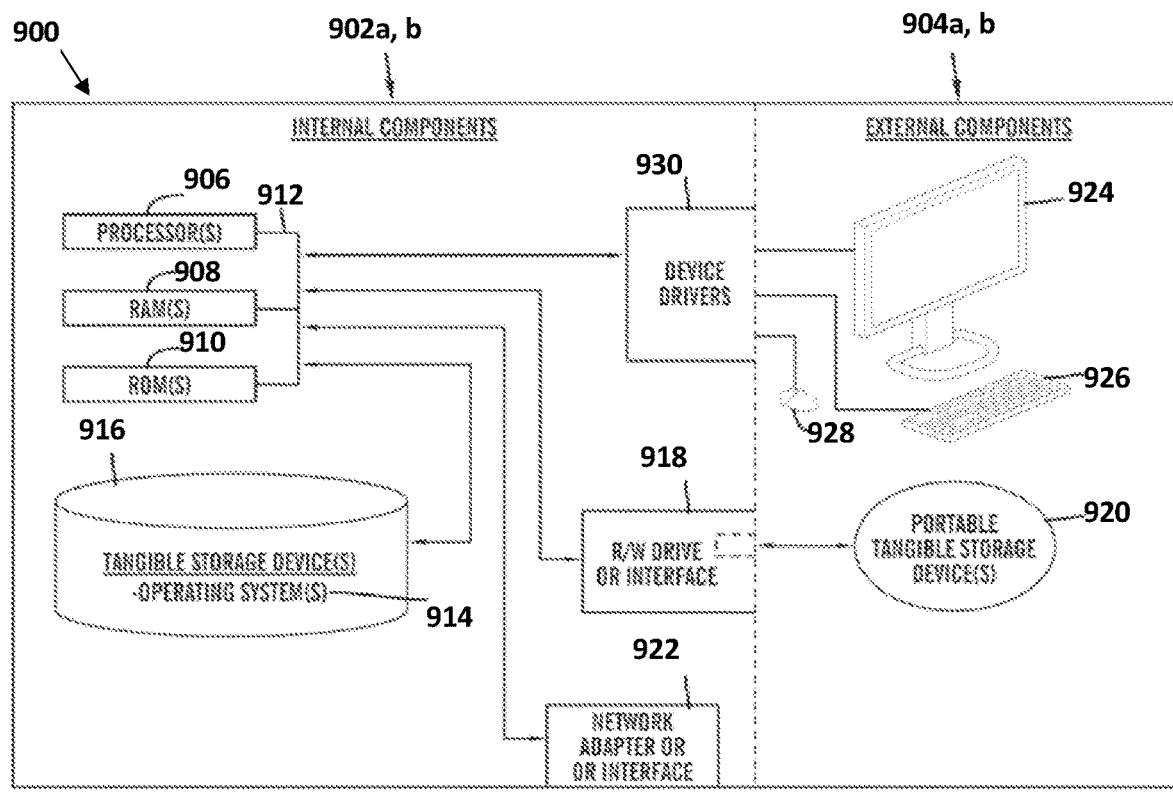
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the information extraction program 110a in client computer 102, and the information extraction program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the information extraction program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G, 4G, and/or 5G wireless interface cards or other wired or wireless communication links. The software program 108 and the information extraction program 110a in client computer 102 and the information extraction program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the information extraction program 110a in client computer 102 and the information extraction program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
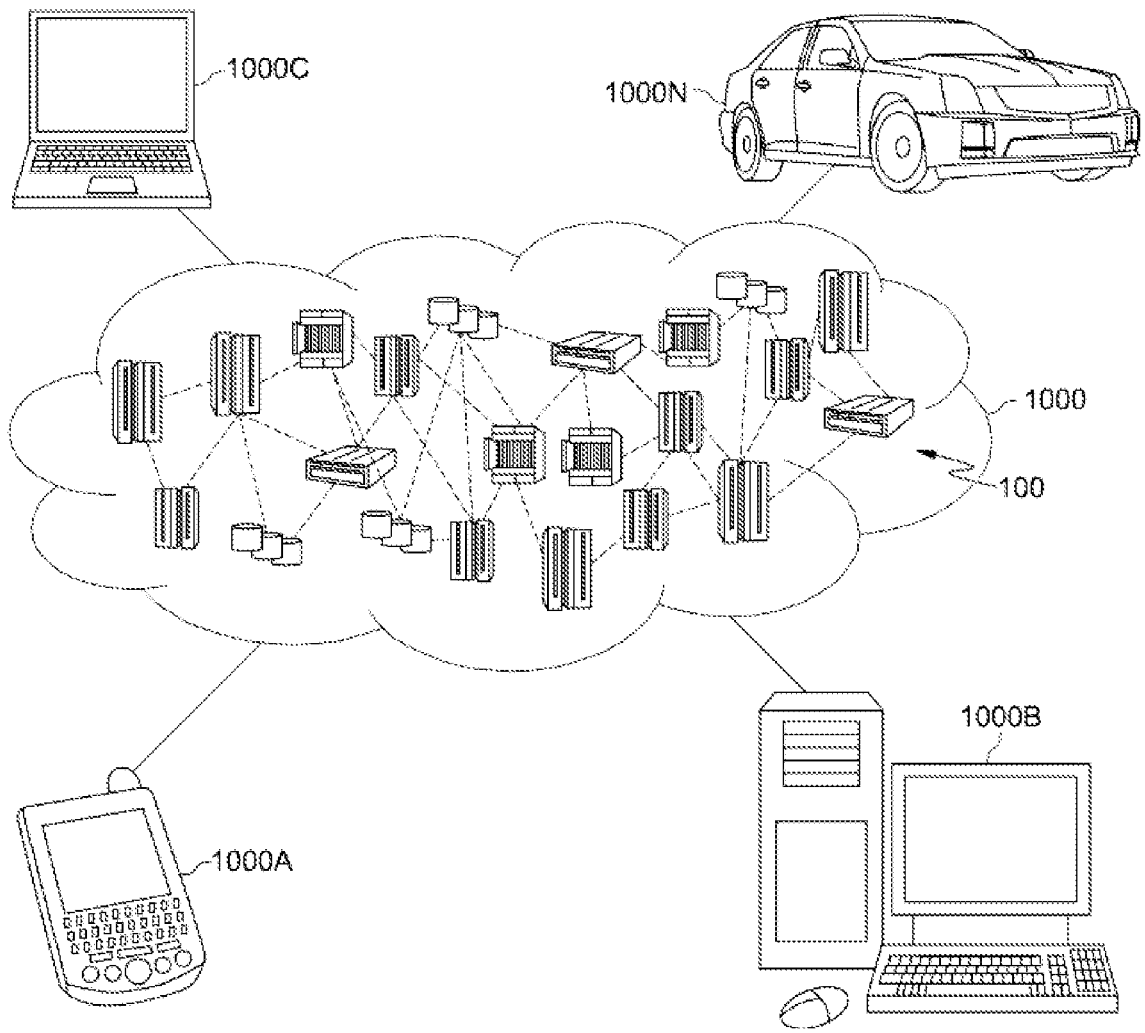
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
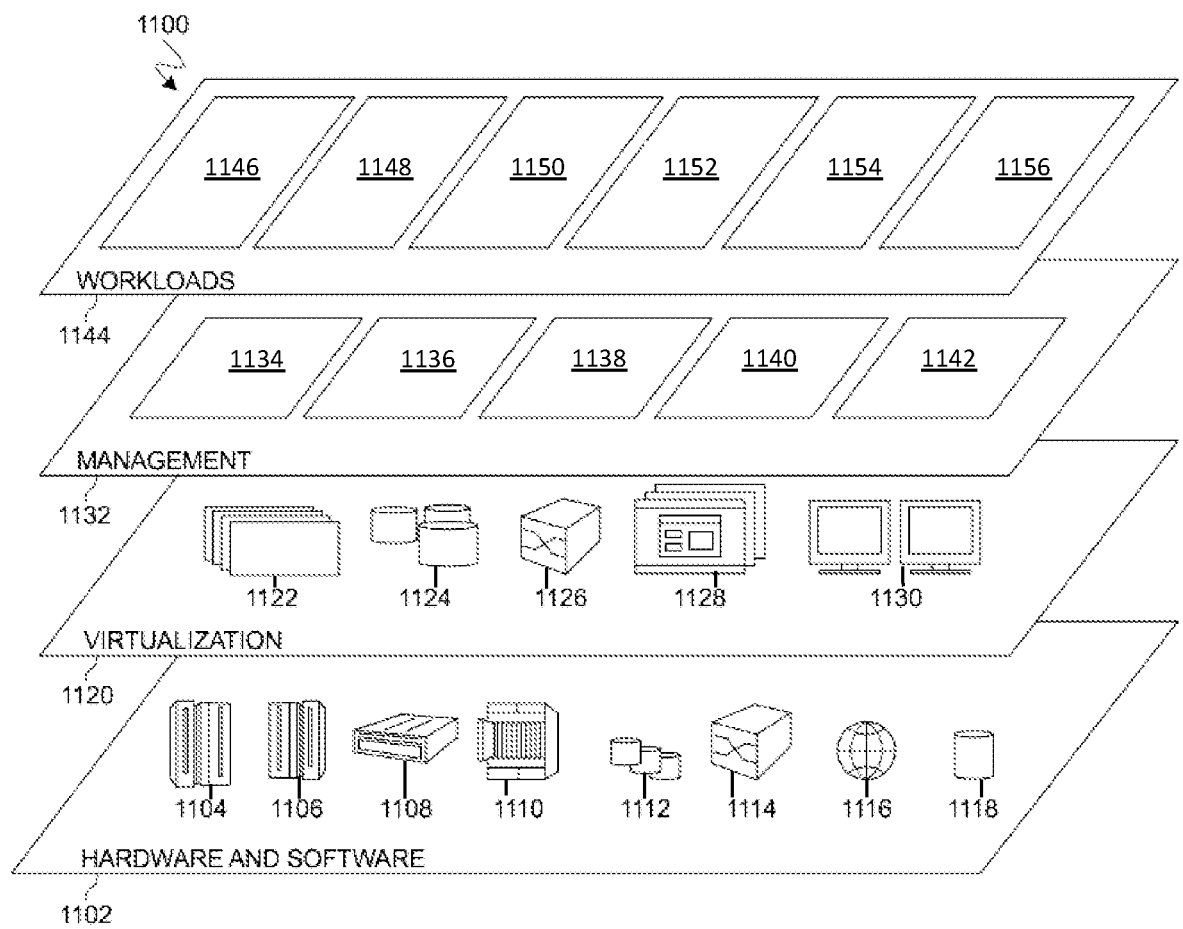
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and information extraction 1156. An information extraction program 110a, 110b provides a way to enhance information extraction from documents containing both typed text and handwritten text by implementing an integrated system including a KVP identification component and handwritten text identification component.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by an integrated system including a key-value pair extraction model interacting with a handwriting detection model, a mixed-text document including a combination of typed text and handwritten text, wherein the mixed-text document includes at least one key-value pair;
receiving, by the handwriting detection model of the integrated system, from the key-value pair extraction model of the integrated system, a first location information of at least one key corresponding to the at least one key-value pair in the mixed-text document, wherein the key-value pair extraction model is encoded with a text embedding layer and a text-position embedding layer and trained to identify the at least one key-value pair from a plurality of input text extracted from the mixed-text document;
based on performing object detection by the handwriting detection model using the first location information of the at least one key as context, detecting, by the handwriting detection model, at least one handwritten text in a vicinity of the at least one key in the mixed-text document, wherein the at least one handwritten text represents at least one value corresponding to the at least one key; and
updating at least one embedding layer of the key-value pair extraction model with the at least one handwritten text detected by the handwriting detection model to iteratively train the key-value pair extraction model to identify the at least one handwritten text as the at least one value corresponding to the at least one key.

2. The method of claim 1, further comprising:
receiving, by the handwriting detection model of the integrated system, a second location information of the at least one value corresponding to the at least one key-value pair in the mixed-text document; and
detecting, by the handwriting detection model of the integrated system, the at least one handwritten text in the mixed-text document based on the second location information of the at least one value received by the handwriting detection model.

3. The method of claim 1, wherein the plurality of input text is extracted from the mixed-text document using an optical character recognition (OCR) component of the integrated system.

4. The method of claim 1, further comprising:
annotating the at least one key in the mixed-text document to generate the first location information of the at least one key.

5. The method of claim 2, further comprising:
annotating the at least one value in the mixed-text document to generate the second location information of the at least one value.

6. The method of claim 4, further comprising:
localizing, by the handwriting detection model of the integrated system, the at least one handwritten text in the vicinity of the at least one key annotated in the mixed-text document.

7. The method of claim 5, further comprising:
localizing, by the handwriting detection model of the integrated system, the at least one handwritten text in a location of the at least one value annotated in the mixed-text document.

8. The method of claim 1, further comprising:
converting, by a handwriting recognition model of the integrated system, the at least one handwritten text detected by the handwriting detection model into at least one machine-readable text.

9. The method of claim 8, further comprising:
refining the plurality of input text for the key-value pair extraction model of the integrated system with the at least one machine-readable text converted from the at least one handwritten text by the handwriting recognition model of the integrated system.

10. The method of claim 8, further comprising:
adding at least one value embedding for the key-value pair extraction model of the integrated system, wherein the at least one value embedding corresponds to the at least one machine-readable text from the handwriting recognition model of the integrated system, and wherein the at least one value embedding is configured to improve a second location information of the at least one value in the mixed-text document.

11. A computer system for information extraction, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving, by an integrated system including a key-value pair extraction model interacting with a handwriting detection model, a mixed-text document including a combination of typed text and handwritten text, wherein the mixed-text document includes at least one key-value pair;
receiving, by the handwriting detection model of the integrated system, from the key-value pair extraction model of the integrated system, a first location information of at least one key corresponding to the at least one key-value pair in the mixed-text document, wherein the key-value pair extraction model is encoded with a text embedding layer and a text-position embedding layer and trained to identify the at least one key-value pair from a plurality of input text extracted from the mixed-text document;
based on performing object detection by the handwriting detection model using the first location information of the at least one key as context, detecting, by the handwriting detection model, at least one handwritten text in a vicinity of the at least one key in the mixed-text document, wherein the at least one handwritten text represents at least one value corresponding to the at least one key; and
updating at least one embedding layer of the key-value pair extraction model with the at least one handwritten text detected by the handwriting detection model to iteratively train the key-value pair extraction model to identify the at least one handwritten text as the at least one value corresponding to the at least one key.

12. The computer system of claim 11, further comprising:
receiving, by the handwriting detection model of the integrated system, a second location information of the at least one value corresponding to the at least one key-value pair in the mixed-text document; and
detecting, by the handwriting detection model of the integrated system, the at least one handwritten text in the mixed-text document based on the second location information of the at least one value received by the handwriting detection model.

13. The computer system of claim 11, wherein the plurality of input text is extracted from the mixed-text document using an optical character recognition (OCR) component of the integrated system.

14. The computer system of claim 11, further comprising:
annotating the at least one key in the mixed-text document to generate the first location information of the at least one key.

15. The computer system of claim 12, further comprising:
annotating the at least one value in the mixed-text document to generate the second location information of the at least one value.

16. The computer system of claim 14, further comprising:
localizing, by the handwriting detection model of the integrated system, the at least one handwritten text in the vicinity of the at least one key annotated in the mixed-text document.

17. The computer system of claim 15, further comprising:
localizing, by the handwriting detection model of the integrated system, the at least one handwritten text in a location of the at least one value annotated in the mixed-text document.

18. A computer program product for information extraction, comprising:
one or more computer-readable tangible storage media and program instructions stored on at least one of the one or more computer-readable tangible storage media, the program instructions executable by a processor to cause the processor to perform a method comprising:
receiving, by an integrated system including a key-value pair extraction model interacting with a handwriting detection model, a mixed-text document including a combination of typed text and handwritten text, wherein the mixed-text document includes at least one key-value pair;
receiving, by the handwriting detection model of the integrated system, from the key-value pair extraction model of the integrated system, a first location information of at least one key corresponding to the at least one key-value pair in the mixed-text document, wherein the key-value pair extraction model is encoded with a text embedding layer and a text-position embedding layer and trained to identify the at least one key-value pair from a plurality of input text extracted from the mixed-text document;

based on performing object detection by the handwriting detection model using the first location information of the at least one key as context, detecting, by the handwriting detection model, at least one handwritten text in a vicinity of the at least one key in the mixed-text document, wherein the at least one handwritten text represents at least one value corresponding to the at least one key; and updating at least one embedding layer of the key-value pair extraction model with the at least one handwritten text detected by the handwriting detection model to iteratively train the key-value pair extraction model to identify the at least one handwritten text as the at least one value corresponding to the at least one key.

* * * * *